United States Patent
Cheng

(10) Patent No.: US 7,954,237 B2
(45) Date of Patent: Jun. 7, 2011

(54) METHOD FOR MANUFACTURING HEAT PIPE AND CAPILLARY STRUCTURE THEREON

(75) Inventor: Kuo-Chang Cheng, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 1086 days.

(21) Appl. No.: 11/735,906

(22) Filed: Apr. 16, 2007

(65) Prior Publication Data

US 2008/0216318 A1    Sep. 11, 2008

(30) Foreign Application Priority Data

Mar. 3, 2007  (TW) ................................ 96107325 A

(51) Int. Cl.
*F28D 15/00* (2006.01)
(52) U.S. Cl. ......... 29/890.032; 29/890.045; 29/890.046; 29/890.049
(58) Field of Classification Search ............. 29/890.032, 29/890.045, 890.046, 890.049, 890.053, 29/890.054, 530, 33 D
See application file for complete search history.

(56) References Cited

U.S. PATENT DOCUMENTS

| | | | | |
|---|---|---|---|---|
| 4,027,723 A * | 6/1977 | Maurino et al. | ............... | 164/213 |
| 4,046,101 A * | 9/1977 | Winkler | ......................... | 118/726 |
| 4,196,504 A * | 4/1980 | Eastman | .................. | 29/890.032 |
| 4,274,479 A * | 6/1981 | Eastman | .................. | 165/104.26 |
| 2005/0235494 A1 * | 10/2005 | Chuang et al. | ........... | 29/890.032 |
| 2006/0143916 A1 | 7/2006 | Tsai et al. | | |

* cited by examiner

*Primary Examiner* — David P Bryant
*Assistant Examiner* — Christopher Besler
(74) *Attorney, Agent, or Firm* — J.C. Patents

(57) ABSTRACT

A method for manufacturing a heat pipe and a capillary structure thereon is provided, and the steps of the method are as follows. A hollow pipe which has an open end and a closed end is provided. A mold is placed into the hollow pipe through the open end. The mold includes a central rod and a shaping component mating with the central rod, and the shaping component has an outward shaping surface. A powder is filled into the space between the hollow pipe and the mold through the open end and then sintered to form a capillary structure on the inner wall of the hollow pipe, in which the capillary structure has a profile corresponding to the shaping surface of the shaping component. Thereafter, the central rod and the shaping component are sequentially taken out of the hollow pipe.

14 Claims, 9 Drawing Sheets

US 7,954,237 B2

METHOD FOR MANUFACTURING HEAT PIPE AND CAPILLARY STRUCTURE THEREON

CROSS-REFERENCE TO RELATED APPLICATION

This application claims the priority benefit of Taiwan application serial no. 96107325, filed Mar. 3, 2007. All disclosure of the Taiwan application is incorporated herein by reference.

BACKGROUND OF THE INVENTION

1. Field of the Invention

The present invention relates to a method for manufacturing a heat sink. More particularly, the present invention relates to a method for manufacturing a heat pipe and a capillary structure thereon.

2. Description of Related Art

With the development of science and technology, electronics have become indispensable in people's daily life. As for a certain electronic product, it can only operate normally and maintain a proper life span under an appropriate temperature. However, as the electronic components inside the electronic product continuously generate heats, these components that generate high heats can only maintain a stable operating temperature through a favorable heat dissipation manner, for example, dissipating heats through a heat sink. Taking an information device for example, in order to improve the heat dissipation efficiency and avoid the noises caused by a fan, a heat pipe has been used to dissipate heats in the mainframe of a computer.

The working principle of the heat pipe is to transfer heats through evaporation and condensation of a fluid. First, a proper working fluid is poured into the heat pipe at a negative pressure state, and the heat pipe has a capillary structure made of a porous material formed on the wall. Next, the working fluid is evaporated at an evaporator, to absorb the heat emitted by components around the evaporator. Then, under a minor pressure difference, the vapor flows towards a condenser to be condensed and to emit heats. Finally, the working fluid condensed at the condenser flows back to the evaporator through the capillary structure under the capillarity effect. Therefore, the working fluid is continuously evaporated and condensed as a circle, so as to dissipate the heats generated by the components around the evaporator.

As the capillary structure in the heat pipe plays an important role in transferring the working fluid, the design of the capillary structure is extremely important, in which the shape, volume, and thickness may possibly affect the heat dissipation efficiency.

FIG. 1 is a schematic view of a conventional heat pipe. Referring to FIG. 1, the heat pipe 100 includes a copper pipe wall 110 and a capillary structure 120. During the manufacturing of the conventional heat pipe 100, a central cylindrical rod is generally employed as a mold to form the capillary structure 120 in the heat pipe 100. Thus, the surface of the conventional capillary structure 120 is usually a plane or of a simple configuration, which relatively restricts the structural design and heat dissipation efficiency of the heat pipe. In particular, theoretically, the thinner the capillary structure 120 is, the better the circular effect of the working fluid in the heat pipe 100 will be, and thus achieving a preferred heat dissipation efficiency. However, in practice, the working fluid that can be absorbed by the capillary structure 120 is getting increasingly less as the capillary structure 120 becomes thinner, which thus restricts the total heats taken by the working fluid. On the other aspect, after considering the normal operation of the process and capillarity, etc., it is found that the thickness of the capillary structure 120 cannot be unrestrictedly reduced. Therefore, the currently available capillary structure 120 formed through a central cylindrical rod cannot achieve an optimal design, and also affects the heat dissipation performance of the heat pipe 100.

SUMMARY OF THE INVENTION

The present invention provides a method for manufacturing a heat pipe and a capillary structure thereon, which can manufacture capillary structures with diversified configurations, so as to enhance the heat dissipation effect for the heat pipe.

The present invention provides a method for manufacturing a heat pipe, and the steps of the method are as follows. First, a hollow pipe having an open end and a closed end is provided. Next, a mold is placed into the hollow pipe through the open end, in which the mold includes a central rod and a shaping component mating with the central rod, and the shaping component has an outward shaping surface. Then, a powder is filled into a space between the hollow pipe and the mold through the open end and then sintered to form a capillary structure on an inner wall of the hollow pipe, in which the capillary structure has a profile corresponding to the shaping surface. Thereafter, the central rod and the shaping component are sequentially taken out of the hollow pipe. Then, a working fluid is poured into the hollow pipe, and the air inside the hollow pipe is drawn out before or after pouring the working fluid. After that, the open end of the hollow pipe is sealed, and thus substantially forming the heat pipe of the present invention.

In the method for manufacturing the heat pipe according to an embodiment of the present invention, the shaping component includes a plurality of shaping rods, respectively disposed on the periphery of the central rod. The central rod has a plurality of guide grooves along the length direction of the central rod, and the shaping rods respectively mate with the central rod through the guide grooves. Moreover, the step of sequentially taking the central rod and the shaping component out of the hollow pipe includes the following steps: for example, first, the central rod is drawn out along an axial direction of the hollow pipe, and the central rod moves relative to the shaping rods; afterwards, the shaping rods are made to be away from the capillary structure along a radial direction of the hollow pipe respectively, and drawn out along the axial direction of the hollow pipe.

Furthermore, in the method for manufacturing the heat pipe according to an embodiment of the present invention, the shaping surface is a sawtooth-shaped surface, for correspondingly forming a plurality of protrusions on the capillary structure. Before sealing the open end of the hollow pipe, the hollow pipe can be heated to further remove the air in the hollow pipe. Moreover, the hollow pipe is made of, for example, copper, and the mold is made of, for example, stainless steel or aluminum. In addition, the material of the powder is, for example, copper, and the working fluid is, for example, water.

The present invention further provides a method for manufacturing a capillary structure on an inner wall of a heat pipe, and the steps of the method are as follows. First, a hollow pipe having an open end and a closed end is provided. Next, a mold is placed into the hollow pipe through the open end, in which the mold includes a central rod and a shaping component mating with the central rod, and the shaping component has an outward shaping surface. Then, a powder is filled into a space between the hollow pipe and the mold through the open end and then sintered to form a capillary structure on the inner wall of the hollow pipe, in which the capillary structure has a profile corresponding to the shaping surface.

In the method for manufacturing the capillary structure on the inner wall of the heat pipe according to an embodiment of the present invention, after the step of sintering the powder, the central rod and the shaping component are sequentially taken out of the hollow pipe. The shaping component includes a plurality of shaping rods, respectively disposed on the periphery of the central rod. Moreover, the central rod has a plurality of guide grooves along the length direction of the central rod, and the shaping rods respectively mate with the central rod through the guide grooves.

In the method for manufacturing the capillary structure on the inner wall of the heat pipe according to an embodiment of the present invention, the step of sequentially taking the central rod and the shaping component out of the hollow pipe includes the following steps, for example, first, the central rod is drawn out along an axial direction of the hollow pipe, and the central rod moves relative to the shaping rods; afterwards, the shaping rods are made to be away from the capillary structure along the radial direction of the hollow pipe respectively, and drawn out along the axial direction of the hollow pipe. Moreover, the shaping surface is a sawtooth-shaped surface, for correspondingly forming a plurality of protrusions on the capillary structure. The hollow pipe is made of, for example, copper, and the mold is made of, for example, stainless steel or aluminum. In addition, the material of the powder is, for example, copper, and the working fluid is, for example, water.

In view of the above, the present invention adopts a mold with a central rod and a shaping component mating with each other to manufacture the capillary structure for a heat pipe, in which after the capillary structure has been manufactured, the central rod and the shaping component can be successfully drawn out of the heat pipe. As such, the capillary structure is not restricted by the mold, and can have diversified configurations. Moreover, the present invention can also achieve a capillary structure with a preferred configuration through the above manufacturing method, so as to further enhance the heat dissipation efficiency of the heat pipe.

In order to make the aforementioned features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
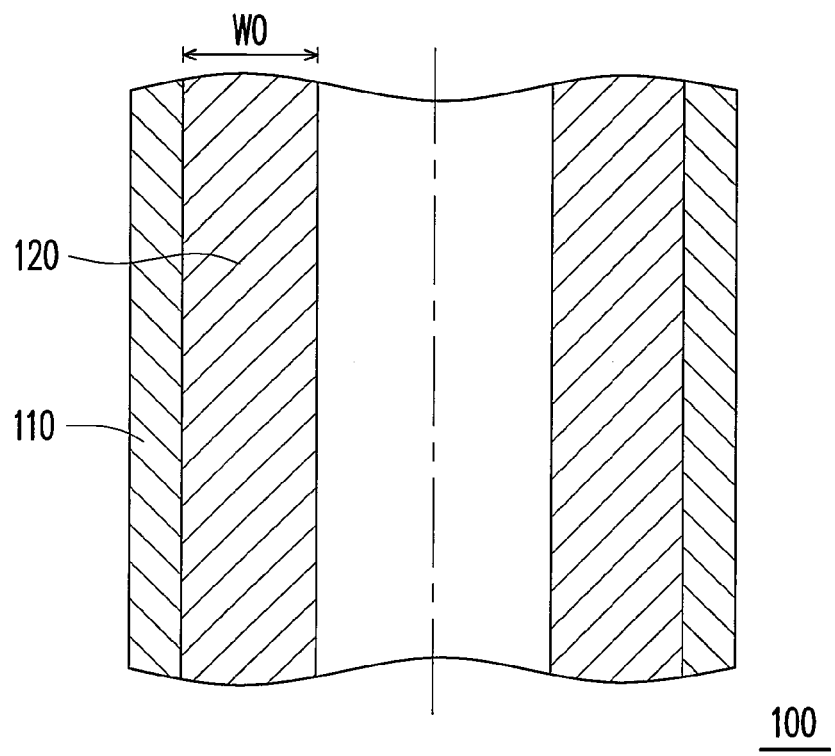
FIG. 1 is a schematic view of a conventional heat pipe.

In order to improve the heat dissipation efficiency of the conventional heat pipe, the principle of a heat pipe is discussed first. The capillary force generated by the capillary structure in the heat pipe has to withstand pressures from various sources in order to make the capillarity effect become effective. More particularly, refer to Formula (1), $$\Delta P_{capillary} = \frac{2\sigma}{r_c} \geq (\Delta P_{vl} + \Delta P_{ll} + \Delta P_w + \Delta P_{phase} + \Delta P_{groove} + \Delta P_g) \quad (1)$$

in which $\Delta P_{capillary}$ indicates a capillary force; $\sigma$ indicates a surface tension of the working fluid; $\Delta P_{vl}$ indicates a pressure drop of the vapor section; $\Delta P_{ll}$ indicates a pressure drop of the fluid section; $\Delta P_w$ indicates a radial pressure drop of the capillary structure; $\Delta P_{phase}$ indicates a pressure drop of the phase change; $\Delta P_{groove}$ indicates a pressure drop of the vapor trench; and $\Delta P_g$ indicates the gravitational pressure drop. Thus, as seen from the formula, the capillary force $\Delta P_{capillary}$ must withstand the pressure drop of the vapor section $\Delta P_{vl}$, the pressure drop of the fluid section $\Delta P_{ll}$, the radial pressure drop of the capillary structure $\Delta P_w$, the pressure drop of the phase change $\Delta P_{phase}$, the pressure drop of the vapor trench $\Delta P_{groove}$, and the gravitational pressure drop $\Delta P_g$, so as to generate the capillarity effect. Among those pressures from various sources, the radial pressure drop of the capillary structure $\Delta P_w$ impinges the most significant influence. As such, a key point of the present invention is to reduce the radial pressure drop of the capillary structure $\Delta P_w$. Then, refer to Formula (2), $$\Delta P_w = \ln\left(\frac{D_0}{D_i}\right)\frac{m\mu_l}{2\pi\rho_l K_w L_w} \quad (2)$$

in which $\Delta P_w$ indicates a radial pressure drop of the capillary structure; $D_0$ indicates an outside diameter of the capillary structure; $D_i$ indicates an inner diameter of the capillary structure; m indicates a mass flow rate of the working fluid; $\mu_l$ indicates a viscosity coefficient of the working fluid; $\rho_l$ indicates a density of the working fluid; $K_w$ indicates a permeability of the capillary structure; and $L_w$ indicates a length of the capillary structure. As seen from Formula (2), the width of the capillary structure in the radial direction may affect the pressure drop of the capillary structure $\Delta P_w$. As the difference between the outside diameter $D_0$ and the inner diameter $D_i$ of the capillary structure (the width of the capillary structure in the radial direction) is getting smaller, the ratio of the two is getting closer to 1. Upon calculating the natural logarithm of the ratio, the result will be getting closer to 0, that is, the value of the pressure drop of the capillary structure $\Delta P_w$ that should be withstood by the capillary force $\Delta P_{capillary}$ decreases accordingly, and thus achieving a more preferred capillarity.

Figure 2:
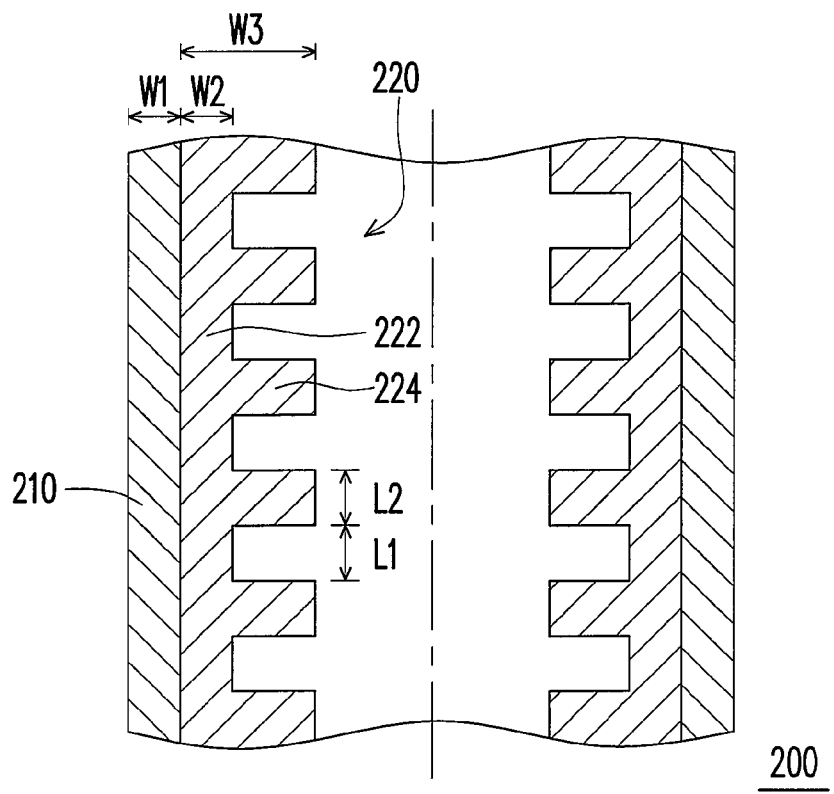
FIG. 2 is a schematic sectional view of a heat pipe according to an embodiment of the present invention.

FIG. 2 is a schematic sectional view of a heat pipe according to an embodiment of the present invention. Referring to FIG. 2, the heat pipe 200 includes a hollow pipe 210 and a capillary structure 220. The inner wall of the hollow pipe 210 has a width of W1, and the hollow pipe 210 is made of copper. The capillary structure 220 is in the shape of an island, and includes a plurality of recesses 222 and a plurality of protrusions 224. The height and width of the recesses 222 are respectively L1 and W2, and the height and width of the protrusions 224 are respectively L2 and W3. However, in another embodiment not shown, the capillary structure 220 can be in the shape of a cone, island, or another appropriate shape. In the capillary structure 220, as the vapor travels along the radial path and is evaporated from the recesses 222 with shorter paths, when the width W0 of the conventional capillary structure 120 (shown in FIG. 1) is equal to the width W2 of the recesses 222 of the capillary structure 220 (shown in FIG. 2), under the same length, the radial pressure drop $\Delta P_w$ of the W0 region for the capillary structure 120 and that of the W2 region for the capillary structure 220 are identical (with reference to Formula 2), that is to say, the pressure drops that should be withstood by the vapor generated by the two capillary structures with the same heat source are identical. However, in a whole, the protrusions 224 of the capillary structure 220 can absorb a larger amount of working fluid, i.e., more working fluid can be converted from liquid to gas to absorb more heats, and the evaporated vapor first travels through the region (W2) with smaller pressure drop, so the capillary structure 220 can bring away more heats. Under this circumstance, the heat dissipation effect of the heat pipe 200 in this embodiment is superior to that of the conventional heat pipe 100.

In another aspect, if it is assumed that the heat pipe 100 and the heat pipe 200 have the same unit length and that the capillary structure 120 and the capillary structure 220 have the same volume, the width W2 of the recesses 222 of the capillary structure 220 is smaller than the width W0 of the conventional capillary structure 120. Under this circumstance, the radial pressure drop $\Delta P_w$ that should be withstood by the capillary force of the capillary structure 220 in this embodiment is smaller than that should be withstood by the capillary structure 120, so that the capillarity effect of the capillary structure 220 is superior to that of the capillary structure 120. As such, the circulation of the working fluid can be accelerated, and thus the heat pipe 200 will have a preferred heat dissipation effect.

Figure 3A:
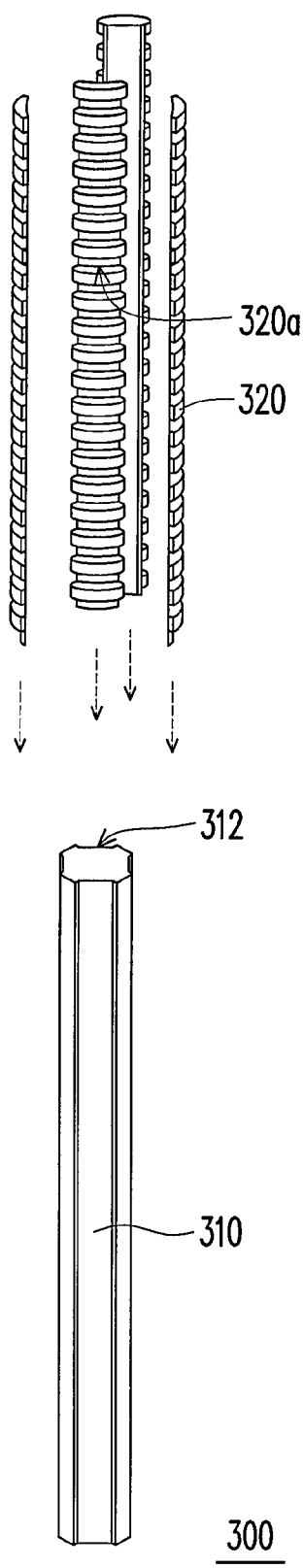
FIG. 3A is a schematic view of a mold for manufacturing the heat pipe in FIG. 2 before being assembled.
Figure 3B:
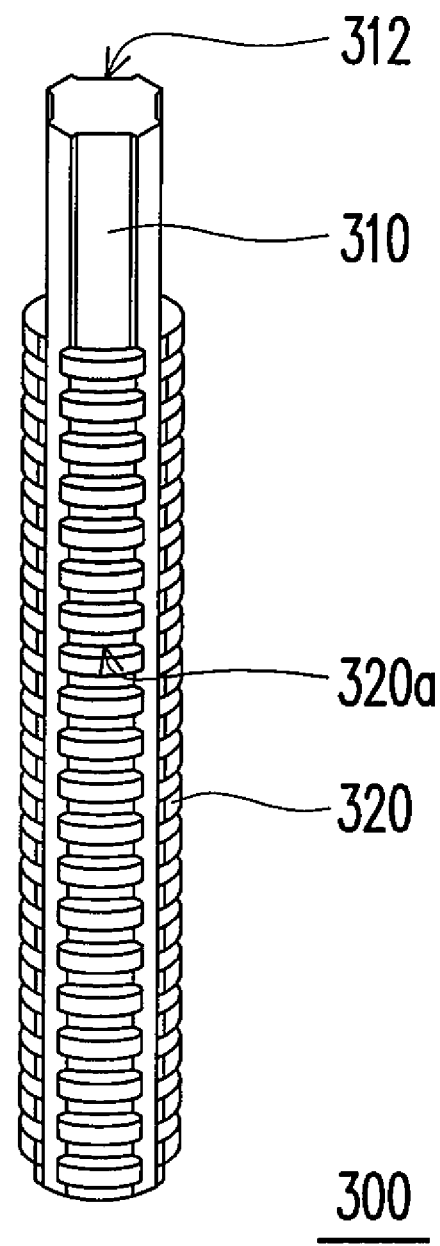
FIG. 3B is a schematic view of the mold for manufacturing the heat pipe in FIG. 2 after being assembled.
Figure 4A:
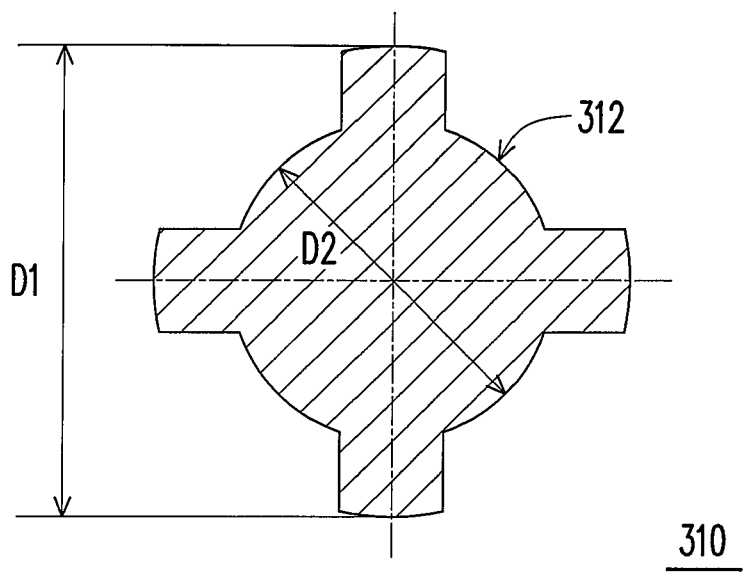
FIG. 4A is a schematic sectional view of a central rod in FIG. 3A.
Figure 4B:
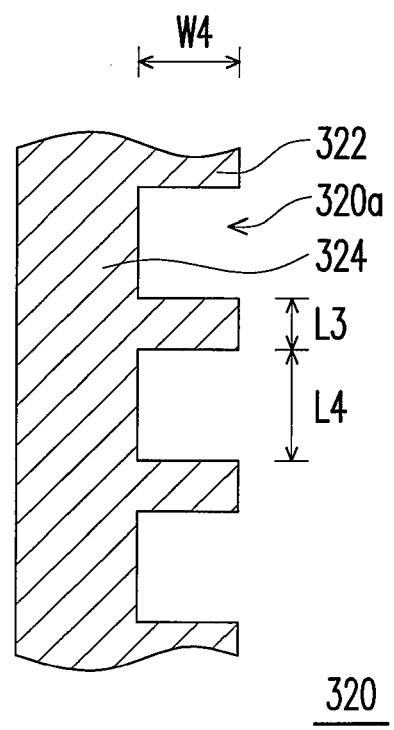
FIG. 4B is a schematic sectional view of a shaping rod in FIG. 3A.

FIG. 3A is a schematic view of a mold for manufacturing the heat pipe in FIG. 2 before being assembled, FIG. 3B is a schematic view of the mold for manufacturing the heat pipe in FIG. 2 after being assembled, FIG. 4A is a schematic sectional view of a central rod in FIG. 3A, and FIG. 4B is a schematic sectional view of a shaping rod in FIG. 3A. Referring to FIG. 3A, the central rod 310 has a plurality of guide grooves 312 along its length direction (four shown in FIG. 3A). The outside diameter D1 of each guide groove is, for example, 3 mm, and the inner diameter D2 is, for example, 2 mm (shown in FIG. 4A), which are not limited herein. Each shaping rod 320 has an outward shaping surface 320a, so as to correspondingly form a plurality of protrusions 224 on the capillary structure 220.

As shown in FIGS. 3A and 3B, the shaping rods 320 respectively mate with the central rod 310 through the guide grooves 312 on the central rod 310. In particular, the shaping rods 32, for example, respectively enter the guide grooves 312 along the arrow direction shown in FIG. 3A, so as to be fixed on the central rod 310.

In this embodiment, the shaping rod 320 includes a plurality of protrusions 322 and a plurality of recesses 324, so as to form the shaping surface 320a into a sawtooth-shaped surface. The width W4 of the protrusions 322 is, for example, 0.4 mm, and the length L3 is, for example, 0.3 mm, whereas the length L4 of the recesses 324 is, for example, 0.7 mm, but which are not limited herein. In another embodiment not shown, the number of the guide grooves 312 for the central rod 310 can be varied appropriately, the shaping rods 320 are not limited to respectively mating with the central rod 310 through the guide grooves 312, and the shaping surface 320a is also not limited to a sawtooth-shaped surface.

Figure 5A:
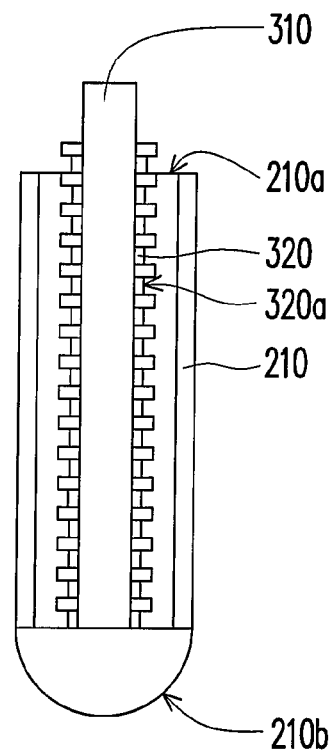
FIGS. 5A-5G are schematic flow charts for manufacturing the capillary structure for the heat pipe in FIG. 2.

FIGS. 5A-5G are schematic flow charts for manufacturing the capillary structure for the heat pipe in FIG. 2. Referring to FIG. 5A, a step of placing a mold into the hollow pipe is performed. First, a hollow pipe 210 having an open end 210a and a closed end 210b is provided, in which the width W1 of the inner wall of the hollow pipe 210 is, for example, 0.3 mm (shown in FIG. 2), which is not limited herein. Then, a mold 300 is placed into the hollow pipe 210 through the open end 210a. The mold 300 includes a central rod 310 and a shaping component (shown in FIGS. 3A and 3B). The shaping component may include a plurality of shaping rods 320 respectively disposed on the periphery of the central rod 310, and the mold is made of stainless steel or aluminum.

Figure 5B:
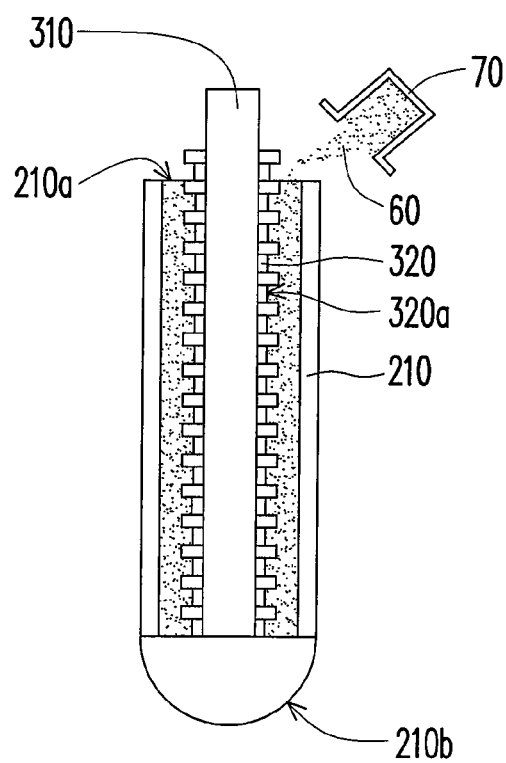
Figure 5C:
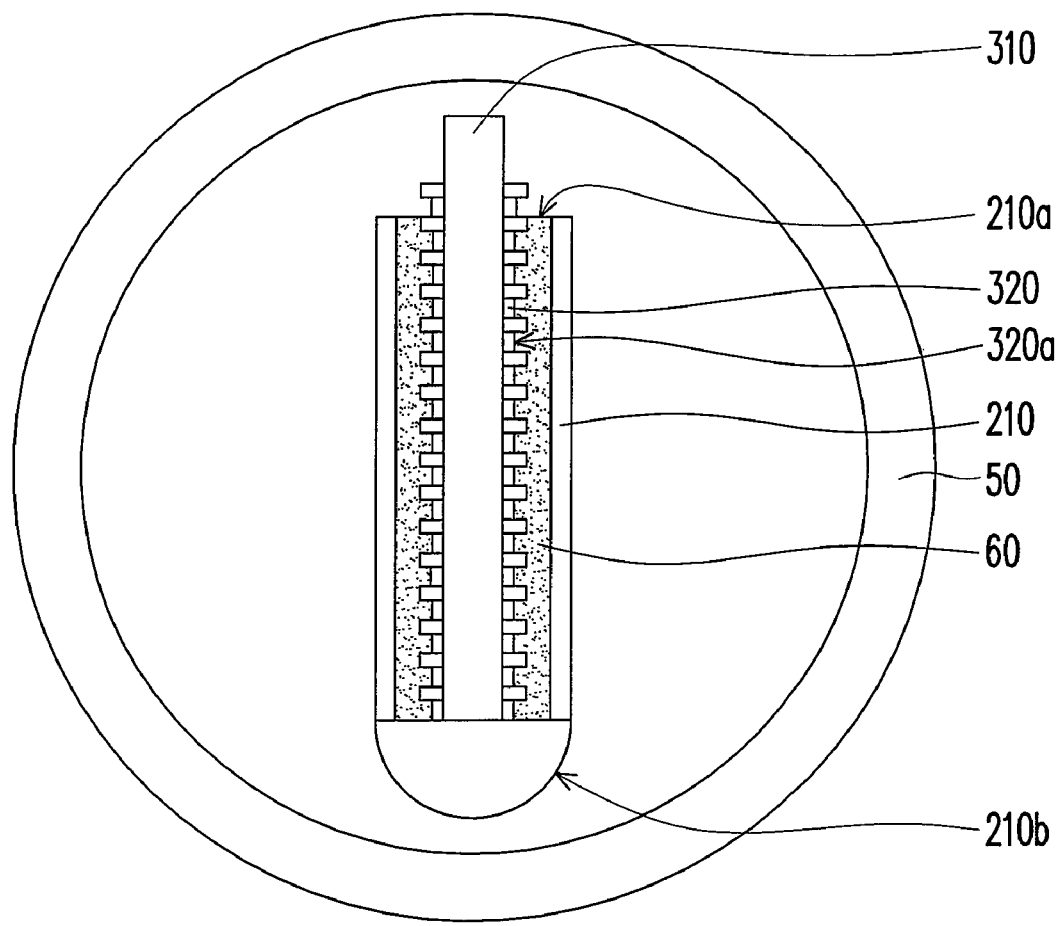
Figure 5D:
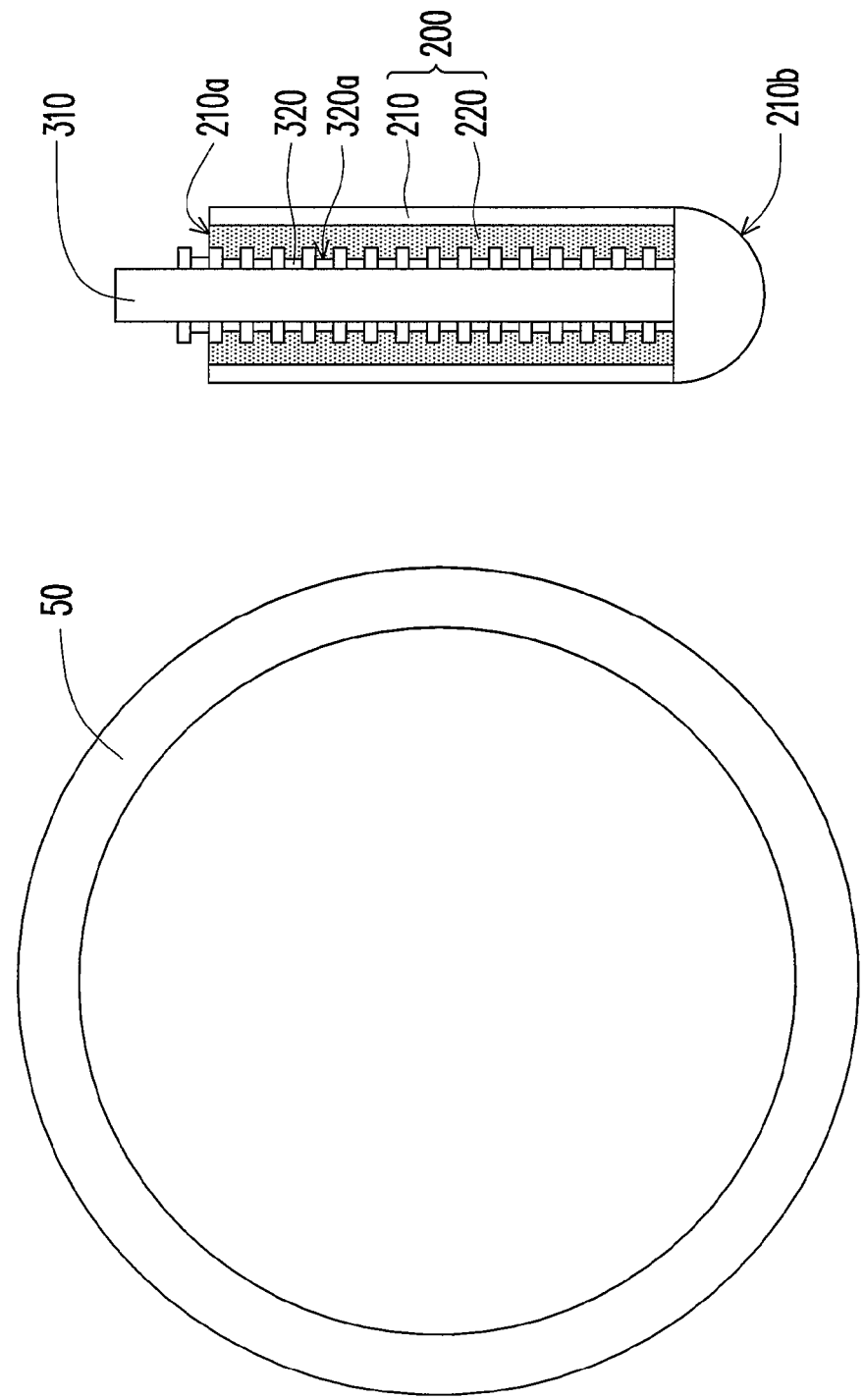
Figure 5E:
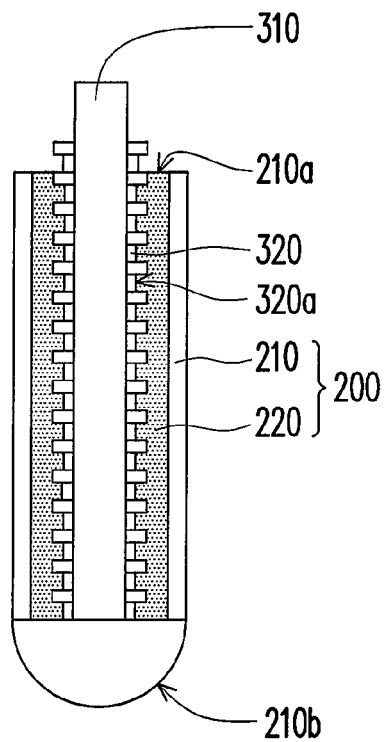
Figure 5F:
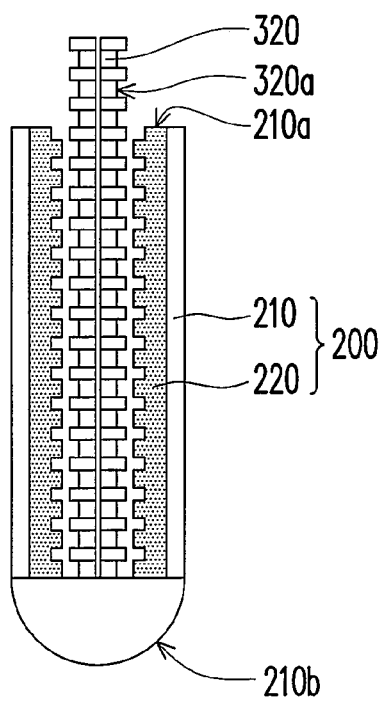

Next, referring to FIG. 5B, a step of filling a powder is preformed. Firstly, a powder 60 in a container 70 is poured into the hollow pipe 210 through the open end 210a and filled into the space between the hollow pipe 210 and the mold 300. The material of the powder 60 includes copper. Then, as shown in FIG. 5C, a step of sintering the heat pipe 200 is performed. First, the heat pipe 200 is placed into a sintering furnace 50 to sinter the powder 60, such that the powder 60 is sintered to form a capillary structure 220 on the inner wall of the hollow pipe 210, in which the capillary structure 220 has a profile corresponding to the shaping surface 320a. Afterward, as shown in FIG. 5D, a step of taking out the heat pipe 200 is performed. Thus, after the heat pipe 200 is taken out of the sintering furnace 50, the sintering process is finished.

After the sintering process, the central rod 310 and the shaping component are sequentially taken out of the hollow pipe 210. In particular, referring to FIG. 5E, a step of taking out the central rod 310 is performed. The central rod 310 is drawn out along the axial direction of the hollow pipe 210, in which the central rod 310 moves relative to the shaping rods 320. Next, referring to FIG. 5F, a step of taking out the shaping rods 320 is performed. The shaping rods 320 are made to be away from the capillary structure 220 along the radial direction of the hollow pipe 210 respectively, and drawn out along the axial direction of the hollow pipe 210. In this embodiment, the width W2 of the recesses 222 for the capillary structure 220 is, for example, 0.4 mm, and the length L1 is, for example, 0.5 mm, whereas the width W3 of the protrusions 224 is, for example, 1.0 mm, and the length L2 is, for example, 0.5 mm, which are not limited herein.

Figure 5G:
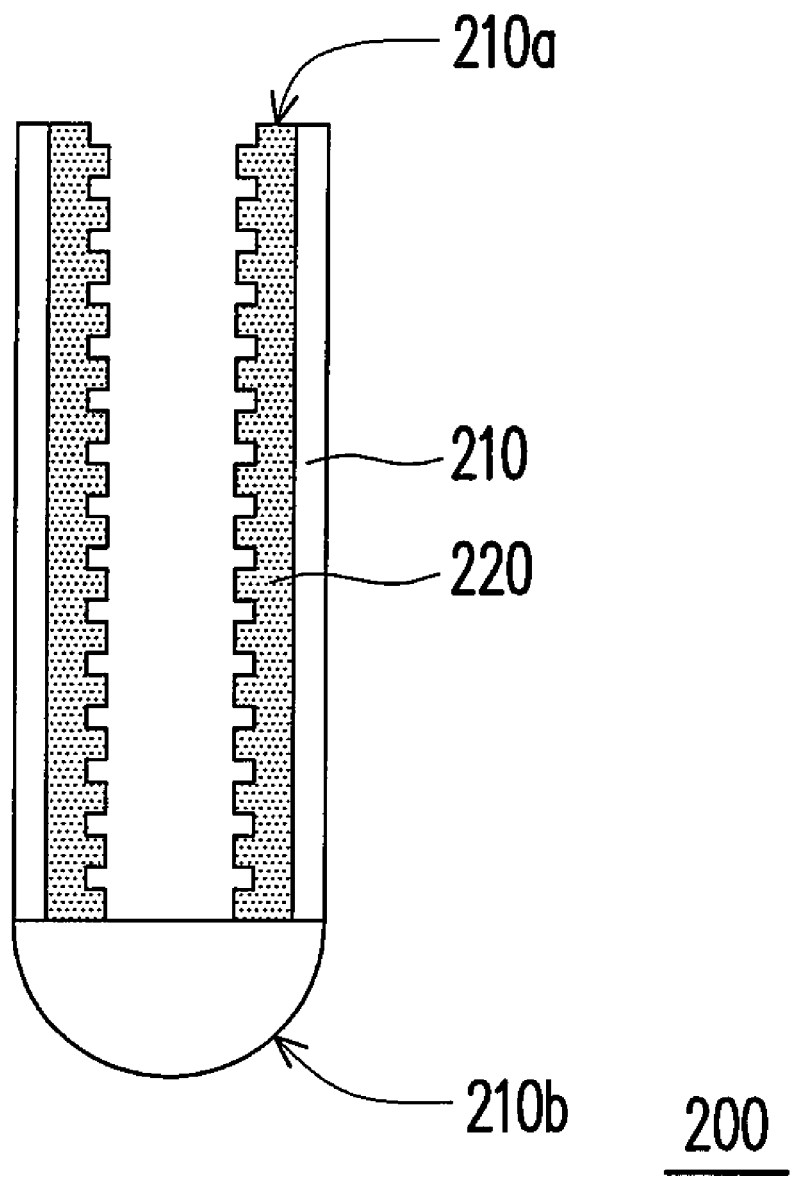

Then, referring to FIG. 5G, the manufacturing of the capillary structure 220 is finished. Afterwards, a working fluid is poured into the hollow pipe 210, and the air inside the hollow pipe 210 is drawn out before or after pouring the working fluid. The working fluid includes water. Furthermore, in theory, though it is preferred to draw out the air from the hollow pipe 210 before pouring the working fluid, upon considering the practical production cost and other working conditions, the air in the hollow pipe 210 is usually drawn out after pouring the working fluid. As such, the cost can be reduced while the air extraction effect is acceptable. Moreover, before sealing the open end 210a of the hollow pipe 210, the hollow pipe 210 can be heated to further remove the air in the hollow pipe 210. Finally, after sealing the open end 210a of the hollow pipe 210, the manufacturing of the heat pipe 200 in this embodiment is finished.

To sum up, compared with the conventional capillary structure, the capillary structure manufactured through the method for manufacturing a heat pipe in the present invention can absorb more working fluid to perform heat exchange, or the radial pressure $\Delta P_w$ that should be withstood by the capillary force is relatively small, and thus the working fluid can be transferred quickly for heat exchange. Therefore, the heat pipe manufactured through the method of the present invention can achieve a more preferred heat dissipation effect. Furthermore, the method for manufacturing a heat pipe in the present invention adopts a mold with a central rod and a shaping component mating with each other. When manufacturing a heat pipe with a complicated capillary structure, the central rod and the shaping component still can be taken out sequentially, such that the capillary structure is not easily restricted by the mold, which facilitates the improvement on the capillary structure, so as to manufacture a heat pipe with preferred heat dissipation effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a heat pipe, comprising:
   providing a hollow pipe having an open end and a closed end;
   placing a mold into the hollow pipe through the open end, wherein the mold has a central rod and a shaping component mating with the central rod, and the shaping component has an outward shaping surface, the shaping component comprising a plurality of shaping rods, respectively disposed on a periphery of the central rod;
   filling a powder into a space between the hollow pipe and the mold through the open end;
   sintering the powder to form a capillary structure on an inner wall of the hollow pipe, wherein the capillary structure has a profile corresponding to the shaping surface;
   drawing out the central rod from the hollow pipe along an axial direction of the hollow pipe, wherein the central rod moves relative to the shaping rods; and
   making the shaping rods away from the capillary structure along a radial direction of the hollow pipe respectively, and drawing out the shaping rods from the hollow pipe along the axial direction of the hollow pipe;
   pouring a working fluid into the hollow pipe, and drawing out an air inside the hollow pipe before or after pouring the working fluid; and
   sealing the open end of the hollow pipe.

2. The method as claimed in claim 1, wherein the central rod has a plurality of guide grooves along the length direction of the central rod, and the shaping rods respectively mate with the central rod through the guide grooves.

3. The method as claimed in claim 1, wherein the shaping surface is a sawtooth-shaped surface, for correspondingly forming a plurality of protrusions on the capillary structure.

4. The method as claimed in claim 1, further comprising heating the hollow pipe before sealing the open end of the hollow pipe, so as to further remove the air in the hollow pipe.

5. The method as claimed in claim 1, wherein the hollow pipe is made of copper.

6. The method as claimed in claim 1, wherein the mold is made of stainless steel or aluminum.

7. The method as claimed in claim 1, wherein the material of the powder comprises copper.

8. The method as claimed in claim 1, wherein the working fluid comprises water.

9. A method for manufacturing a capillary structure on an inner wall of a heat pipe, comprising:
   providing a hollow pipe having an open end and a closed end;
   placing a mold into the hollow pipe through the open end, wherein the mold has a central rod and a shaping component mating with the central rod, and the shaping component has an outward shaping surface, the shaping component comprising a plurality of shaping rods, respectively disposed on a periphery of the central rod;
   filling a powder into a space between the hollow pipe and the mold through the open end;
   sintering the powder to form a capillary structure on the inner wall of the hollow pipe, wherein the capillary structure has a profile corresponding to the shaping surface;
   drawing out the central rod from the hollow pipe along an axial direction of the hollow pipe, wherein the central rod moves relative to the shaping rods; and
   detaching the shaping rods from the capillary structure along a radial direction of the hollow pipe respectively, and drawing out the shaping rods from the hollow pipe along the axial direction of the hollow pipe.

10. The method as claimed in claim 9, wherein the central rod has a plurality of guide grooves along the length direction of the central rod, and the shaping rods respectively mate with the central rod through the guide grooves.

11. The method as claimed in claim 9, wherein the shaping surface is a sawtooth-shaped surface, for correspondingly forming a plurality of protrusions on the capillary structure.

12. The method as claimed in claim 9, wherein the hollow pipe is made of copper.

13. The method as claimed in claim 9, wherein the mold is made of stainless steel or aluminum.

14. The method as claimed in claim 9, wherein the material of the powder comprises copper.

* * * * *